United States Patent

Takeuchi et al.

[11] Patent Number: 5,773,785
[45] Date of Patent: Jun. 30, 1998

[54] PLASMA CUTTING APPARATUS FOR CONCRETE STRUCTURES

[75] Inventors: Yuukou Takeuchi, Nagoya; Hitoshi Hayakawa, Toukai; Taku Murakami, Kawasaki; Tooru Fukuda, Kawasaki; Akifumi Hoshino, Kawasaki, all of Japan

[73] Assignees: Komatsu Ltd., Tokyo; Daido Tokushuko Kabushiki Kaisha, Nagoya, both of Japan

[21] Appl. No.: 659,988

[22] Filed: Jun. 7, 1996

[30] Foreign Application Priority Data

Jun. 7, 1995  [JP]  Japan ..................................... 7-140629
Nov. 24, 1995 [JP]  Japan ..................................... 7-306296

[51] Int. Cl.$^6$ .................................................. B23K 10/00
[52] U.S. Cl. ............................. 219/121.44; 219/121.39; 219/121.52; 219/121.53; 266/51
[58] Field of Search ......................... 219/121.39, 121.44, 219/121.59, 121.48, 121.51, 75, 121.53, 121.52; 266/48–54, 46

[56] References Cited

U.S. PATENT DOCUMENTS 4,710,607  12/1987  Wilhelmi et al. ..................... 219/121.5
5,298,714  3/1994  Szente et al. ....................... 219/121.48
5,393,952  2/1995  Yamaguchi et al. .................. 219/121.5
5,440,093  8/1995  Sugaya et al. ........................ 219/121.5
5,500,501  3/1996  Lynum et al. ...................... 219/121.48
5,532,449  7/1996  Murakami ........................... 219/121.59

*Primary Examiner*—Mark H. Paschall
*Attorney, Agent, or Firm*—IP Group of Pillsbury Madison & Sutro LLP

[57] ABSTRACT

A compact plasma cutting apparatus suitable for the thermal cutting of concrete structures includes a sealed housing to which a plasma gas is fed under pressure. A metal strip that serves as an outer hollow electrode is bent such that a widthwise section thereof is in circular form, while a metal rod or tube is continuously inserted through a hollow portion of the thus formed outer electrode, with an insulator located between both electrodes. While gas is passed between the inner and outer electrodes, an arc is produced at open ends of both electrodes to generate a plasma gas, which is in turn blown onto a concrete structure for thermal cutting. The formation of both electrodes is effected depending on consumption of the electrodes, thereby carrying out thermal cutting continuously. A high-efficient yet economical cutting method is achieved using the cutting apparatus.

2 Claims, 3 Drawing Sheets

PLASMA CUTTING APPARATUS FOR CONCRETE STRUCTURES

BACKGROUND OF THE INVENTION

The present invention relates to apparatus for thermally cutting reinforced concrete structures and bulky mineral materials such as rocks and firebricks.

For thermally cutting reinforced concrete structures and bulky mineral materials such as rocks and firebricks, there have so far been developed and employed methods using flame jets as heat sources, typically represented by a burning method using oxygen lances provided by DIN32510, as well as other various methods making use of high temperatures generated by plasmas and lasers.

For the purpose of thermally cutting bulky mineral materials, the higher the temperature of the heat source used, the higher the cutting speed and efficiency. In this regard, plasmas and lasers are more favorable heat sources than flame jets. However, difficulties associated with laser generators are that they cost much, and must produce large quantities of laser so as to treat large structures, especially concrete structures. On the other hand, plasmas provide a heat source enabling high temperatures to be obtained with relative ease, and so have been used for the welding and thermal cutting of metallic materials.

In plasma torches so far used in the prior art, non-consumable electrodes are basically used, but yet electrode assemblies are of complicated construction and large dimensions because they should be protected as by water cooling.

However, one serious problem associated with such conventional plasma torches is that difficulty is involved in holding them when used to thermally cut large structures such as concrete structures because they must be moved over long distances. Another problem with such large torches arises in connection with drilling; in other words, the inner diameters of the holes to be drilled become larger than required.

SUMMARY OF THE INVENTION

Thus, a primary object of the present invention is to provide a compact plasma cutting apparatus suitable for the thermal cutting of concrete structures, etc.

For the inner electrode, conventionally available flux cored wires made by known methods may be used. Alternatively, such flux cored wires may be prepared just before the inner electrode is inserted through the outer electrode. One disclosure for such procedures is provided in JP-B-7-80065, wherein a metal strip is bent into a piece of U-shape in section in which flux powders are filled. Then, this U-shaped piece is further bent until a section thereof is in O-form; its edges abut upon each other, if required, followed by butt welding. When this technique is applied to the present invention, any welding method can be used. Still alternatively, flux powders may be fixedly provided on one surface of the metal strip by means of a suitable binder to form a powder layer thereon, and the metal strip may then be bent with that surface inside.

The first electrode formed of a metallic hollow rod and the second electrode formed of a metallic rod form part of the electrode assembly for generating plasma gas jets.

The insulator located between the opposite sides of the first and second electrodes makes electric insulation between the opposite sides of the first and second electrodes, so that any possible electric discharge between them can be avoided. This then enables electric discharge to be confined to the open ends thereof. It is here to be understood that the insulator is not necessarily covered all over the opposite surfaces of both electrodes. In other words, the insulator is provided such that any possible chance of electric discharge at portions of the electrodes other than their open ends can be prevented. The material of which the insulator is formed may be an insulating material having a suitable degree of heat resistance. Preferably, a flux is used for the insulator.

Between the first and second electrodes there is located the gas-flowing passage for feeding plasma gas to the discharge ends of the electrode assembly. Another action of this gas-flowing passage is that the opposite sides of the first and second are cooled by a gas flowing there through.

The plasma gas feeder mechanism functions to feed the plasma gas from one end of the electrode assembly via the gas-flowing passage therein to the other end of the electrode assembly, from which the plasma gas is to be jetted.

The plasma power source functions to apply voltage between the first and second electrodes to effect electric discharge at said other end of the electrode assembly so that the jetted gas can be converted to a plasmatic state.

In another embodiment of the invention, a longitudinally extending through-hole is formed through the second electrode, and functions as an oxygen gas-flowing passage for feeding oxygen gas toward the center of the plasma gas jet.

In a further embodiment of the invention, an oxygen gas feeder mechanism is used to feed the required amount of oxygen gas via the oxygen gas-flowing through-hole in the second electrode to the center of the plasma gas jet.

In the plasma cutting method for concrete structures, an arc is produced between the ends of the first and second electrodes simultaneously with the jetting of the gas from those ends of the electrodes, so that the thus jetted gas can be converted to a plasmatic state. With the plasma gas jet directed to the structure to be cut, the structure is heated and melted, and so can be cut or drilled as desired.

The plasma generator used herein is smaller than a conventional plasma torch, and so enables a maximum temperature portion of the plasma gas jet to be close to the desired site of the structure to be cut, whereby that site can be heated and melted for efficient cutting or drilling.

Under the action of the heat of the plasma gas jet, the electrodes start to melt away from the discharge ends. The thus melted electrode metal, in the form of melt particles, is carried by the plasma gas jet to the surface of the structure to be cut, which is exposed to the jetted plasma gas. On that surface the melt particles react with the structure to be cut to form reaction products having a low melting point, thereby accelerating the melting of the structure to be cut. Therefore, it is desired that a metal capable of reacting with the structure to be cut to form reaction products having a low melting point be used for the metal material forming the first and second electrodes.

The electrode assembly is located near to high-temperature plasmas, and the first electrode is in contact with high-temperature off-gases especially when a concrete structure is to be drilled to some considerable depth. To avoid rapid consumption of the electrode assembly, therefore, it is desired to use an electrode material having a high melting point. Preferably, iron is used for the electrode material.

To form the plasma gas, nitrogen, argon or oxygen, or mixtures of two or more may be used because these gases make it easy to obtain a more stable high-temperature plasma, and are relatively inexpensive as well. When oxygen is used in combination with nitrogen and argon, the oxidation of the above-mentioned melt particles is accelerated by oxygen, so that the melting point of the product of reaction between the melt particles and the structure to be cut can be reduced.

Thus, nitrogen, argon or oxygen, or a mixture of two or more can be jetted through the gas-flowing through-hole extending through the second electrode toward the center of the jetted plasma gas. Oxygen, when used, may be diluted with nitrogen, argon or the like to regulate the activity thereof.

In a still further embodiment of the invention, at least one member selected from the group consisting of iron, aluminum, iron oxide, alumina, fluorite, ilmenite, rutile, and boride, all in powdery forms, is jetted together with the above-mentioned jetted plasma gas. These metals and minerals, because of reacting with the structure to be cut to form compounds having a low melting point, have an action on making the cutting or drilling of the structure easy. The addition of the above-mentioned metals also enables the heat thereof by oxidation to be used. The co-addition of aluminum and iron oxide ensures that much heat can be obtained by thermit reaction.

In the present invention the above-mentioned metals and minerals are used in powdery forms, primarily because they can be easily carried by gases, and have a large specific area which ensures high activity.

As already stated, electrical insulation is made between the inner and outer electrodes, and so arcs are produced at the open ends alone when voltage is applied between them, as can be seen from FIG. 6. Upon the gas(es) passing between both inner and outer electrodes and jetted from the open ends, the gas is converted by arcs into a plasma gas.

The open ends of the electrodes heated to high temperature by arcs melt away inch by inch, and the melt is carried out by the jetted gas in the form of droplets. Thus, the ends of the electrodes melt away little by little. To compensate for this, the hollow member forming the outer electrode is fed forward and, with this, the metal rod or tube forming the inner electrode is fed forward. The insulator located between the inner and outer electrodes is burned or decomposed by the heat of arcs starting from the outermost end, and then vanishes. However, since portions of the insulator within the electrode assembly are cooled by the flowing gas, they do not vanish or remain intact.

By the electrode assembly which is of simple construction and can be reduced in diameter, the high-temperature plasma gas can be converged onto a limited site of the concrete structure for melting. The oxygen contained in the jetted gas travels while oxidizing droplets of the metal derived from the electrodes, so that the gas and oxides heated by the heat by oxidation at higher temperatures are blown onto the concrete structure. Although concrete minerals containing silica as a major component and alumina and lime as subordinate components have a high melting point by themselves, yet they can easily melt if mixed with other components oxides of alkali metals and iron oxides, because compounds having a lower melting point occur. Of course, the use of the flux accelerates this process. When a mixture of iron oxide powders with aluminum powders is blown onto the surface of concrete, higher temperatures can be used by thermit reaction. The resulting metallic iron can be further oxidized to produce much heat.

The thus melted surface of concrete is blown off by the plasma gas, so that a dent can be made therein. This dent can be made much deeper by moving forward the leading ends of the electrodes so that the desired through-hole can finally be obtained. Once a hole having a desired depth or a through-hole has been obtained, the electrodes are pulled out, and located at a position in the vicinity of the completed hole for melting and drilling. By repeating this operation it is possible to cut the concrete plate structure. According to a preferred method for using the apparatus of the present invention, the electrodes are continuously formed so that cutting operation can be continued without any interruption required in the case of one electrode having a limited length.

BRIEF DESCRIPTION OF THE DRAWINGS

For the purpose of illustration alone, some embodiments of the plasma cutting apparatus for concrete structures according to the present invention will now be explained with reference to the accompanying drawings, in which.

DETAILED EXPLANATION OF THE PREFERRED EMBODIMENTS

First Embodiment

Figure 1:
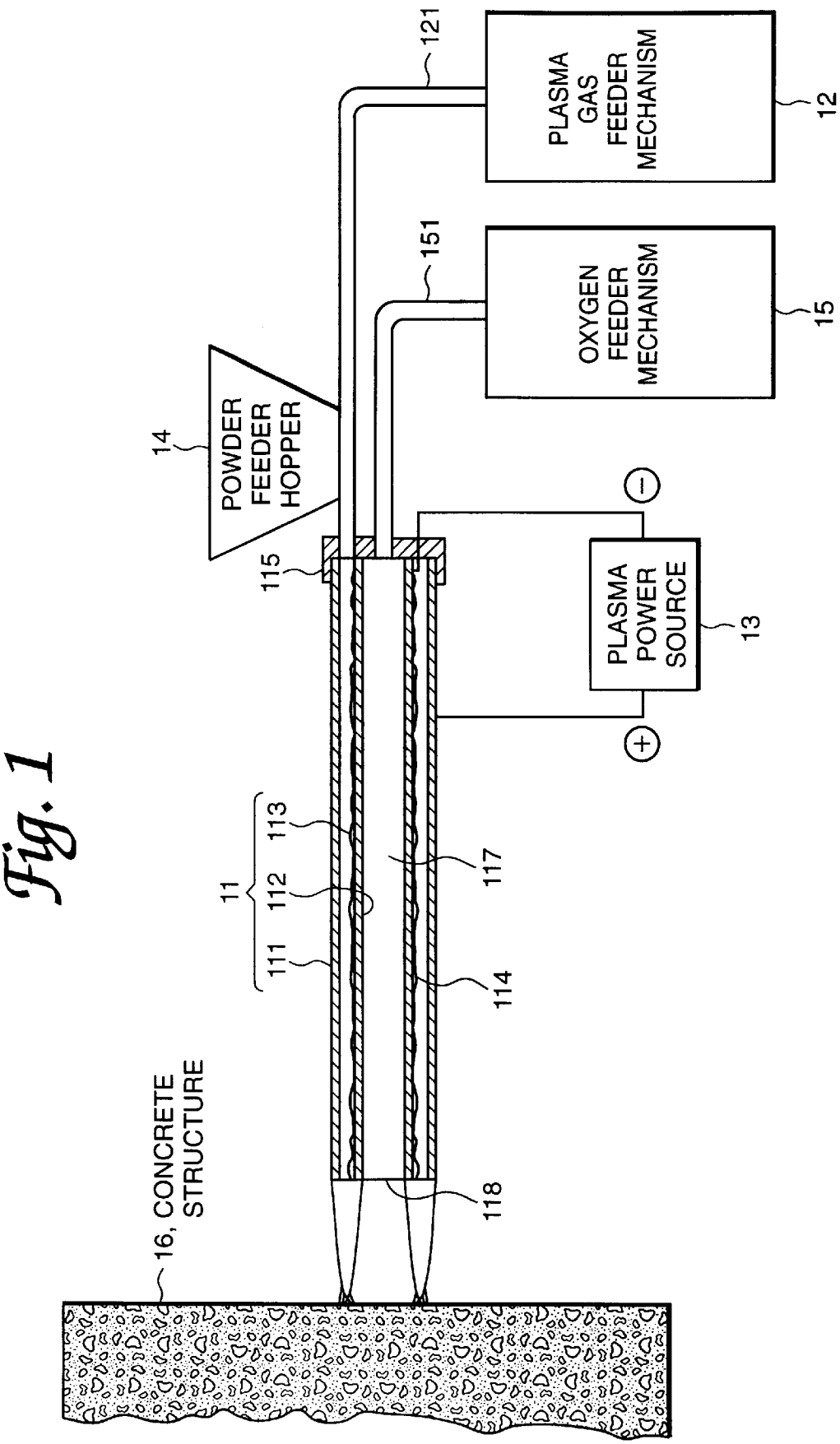
FIG. 1 is a schematic view of the layout of Embodiment 1 of the plasma cutting apparatus for concrete structure according to the present invention.

Referring first to FIG. 1, there is schematically illustrated a basic layout of the first embodiment of the plasma cutting apparatus for concrete structures according to the present invention. The first embodiment is primarily made up of an electrode assembly 11, a plasma gas feeder mechanism 12, a plasma power source 13, a powder feeder hopper 14, and an oxygen feeder mechanism 15.

The electrode assembly 11 comprises a first electrode 111 formed of a soft steel pipe having an outer diameter of 17.5 mm and a thickness of 2.3 mm, and a second electrode 112 formed of a soft steel pipe having an outer diameter of 9 mm and a thickness of 1 mm. The second electrode 112 includes on the outside an insulator 113 of 1.5 mm in thickness, which is formed of an ilmenite type flux. Between the first and second electrodes 111 and 112 there is provided a gas-flowing passage 114. The electrode assembly 11 is sealed up at one end with an ebonite sealer 115, and the first and second electrodes 111 and 112 are fixedly insulated from each other. The electrode assembly 11 remains open at the other end to define an open end 118. The electrode assembly 11 has a length of 1 meter.

Figure 2:
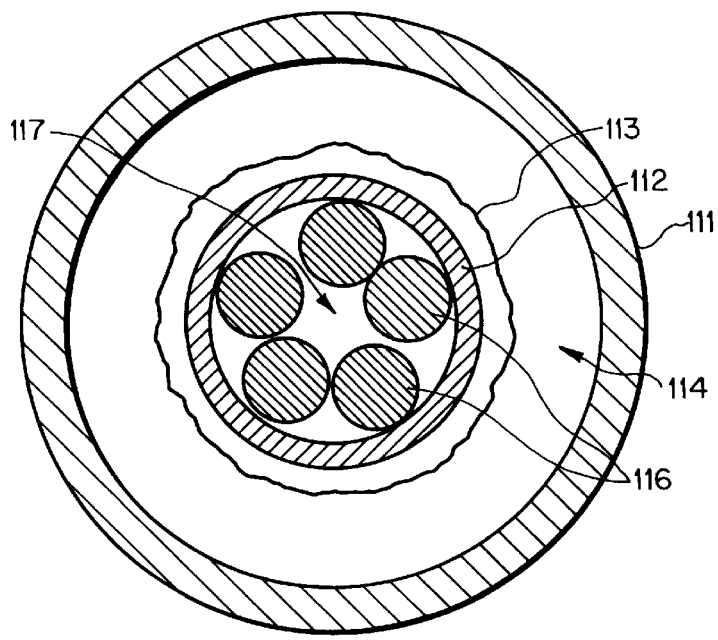
FIG. 2 is a cross-sectional view of the electrode assembly used in Embodiment 1 of the present invention.

To regulate the cross-sectional area of a gas-flowing through-hole 117 extending through the second electrode 112, five regulating wires 116, each formed of a soft steel wire of 3 mm in diameter, are inserted through the hole 117, as can be seen from FIG. 2.

Although not illustrated, the plasma gas feeder mechanism 12 comprises a gas cylinder, a decompressor, a flow rate regulator, a gas mixer, and the like. A plasma feeder pipe 121 is provided to make a connection between the plasma gas feeder mechanism 12 and the electrode assembly 11 to guide plasma gas into the gas-flowing passage 114.

A part of the plasma gas feeder pipe 121 is connected with the powder feeder hopper 14 which, although not illustrated, comprises a powder tank, a powder feeding means, and the like.

Although not illustrated, the oxygen gas feeder mechanism 15 comprises a gas cylinder, a decompressor a flow rate regulator, a gas mixer, and the like. An oxygen gas feeder pipe 151 is provided to make a connection between the oxygen gas feeder mechanism 15 and the electrode assembly 11 to guide oxygen gas into the gas-flowing through-hole 117.

The plasma power source 13 is a constant current type of power source, and is coupled with the first and second electrodes 111(plus) and 112(minus).

EXAMPLE 1-1

The above-mentioned apparatus was operated as follows. First, argon was fed into the plasma gas feeder pipe 121 by the actuation of the plasma gas feeder mechanism 12, so that the argon was jetted from the open end 118 via the gas passage 114. The argon was then set at a pressure of 10 atm.

Then, the plasma power source 13 was put into operation to apply voltage between the first and second electrodes 111 and 112, there by generating electric discharge at the open end 118 of the electrode assembly 11. The resulting discharge current was 700 A. In this way, the argon plasma gas was jetted from the open end 118.

The structure 16 to be thermally cut was a concrete plate of 100 mm in thickness. Thermal cutting was started with the jetted plasma gas directed to the site of the structure 16 to be drilled through. The thermal cutting was continued while the location of the electrode assembly 11 was regulated depending on a change in the site to be thermally cut, and the consumption of the electrode assembly 11.

Consequently, a through-hole of about 50 mm in diameter was obtained by a 60-second thermal cutting operation.

EXAMPLE 1-2

Thermal cutting was done following Example 1-1 with the exception that the oxygen feeder mechanism 15 was actuated to feed a gas mixture of argon +10% oxygen into the oxygen gas feeder pipe 151, so that the gas mixture was jetted from the open end 118 via the gas-flowing through-hole 117. The gas mixture of argon +10% oxygen was set at a pressure of 8 atm.

As in Example 1-1, the structure 16 to be thermally cut was a concrete plate of 100 mm in thickness. Consequently, a through-hole of about 25 mm in diameter was obtained by a 20-second thermal cutting operation.

EXAMPLE 1-3

Thermal cutting was done following Example 1-2 with the exception that the powder feeder mechanism 14 was actuated to add 100 to 200-mesh iron powders to the plasma gas at a rate of 250 g/min.

As in Example 1-1, the structure 16 to be thermally cut was a concrete plate of 100 mm in thickness. Consequently, a through-hole of about 25 mm in diameter was obtained by a 10-second thermal cutting operation.

EXAMPLE 1-4

Thermal cutting was done following Example 1-3 with the exception that in addition to the iron powders 100-mesh aluminum powders were added to the plasma gas at a rate of 17 g/min.

As in Example 1-1, the structure 16 to be thermally cut was a concrete plate of 100 mm in thickness. Consequently, a through-hole of about 25 mm in diameter was obtained by a 6-second thermal cutting operation.

Comparative Example 1

Experimentation was carried out with the apparatus used in Example 1-3, from which the plasma power source 13 was removed, and under the same conditions as in Example 1-4 with the exception that 100% oxygen was fed by the oxygen feeder mechanism 15 in the absence of the plasma power source 13. The gas jetted from the open end 118 was ignited by an igniter.

The structure 16 to be thermally cut was again a concrete plate of 100 mm in thickness. As a result, a 180-second thermal cutting operation was needed for obtaining a through-hole of about 50 mm in diameter.

Embodiment 2

Figure 3:
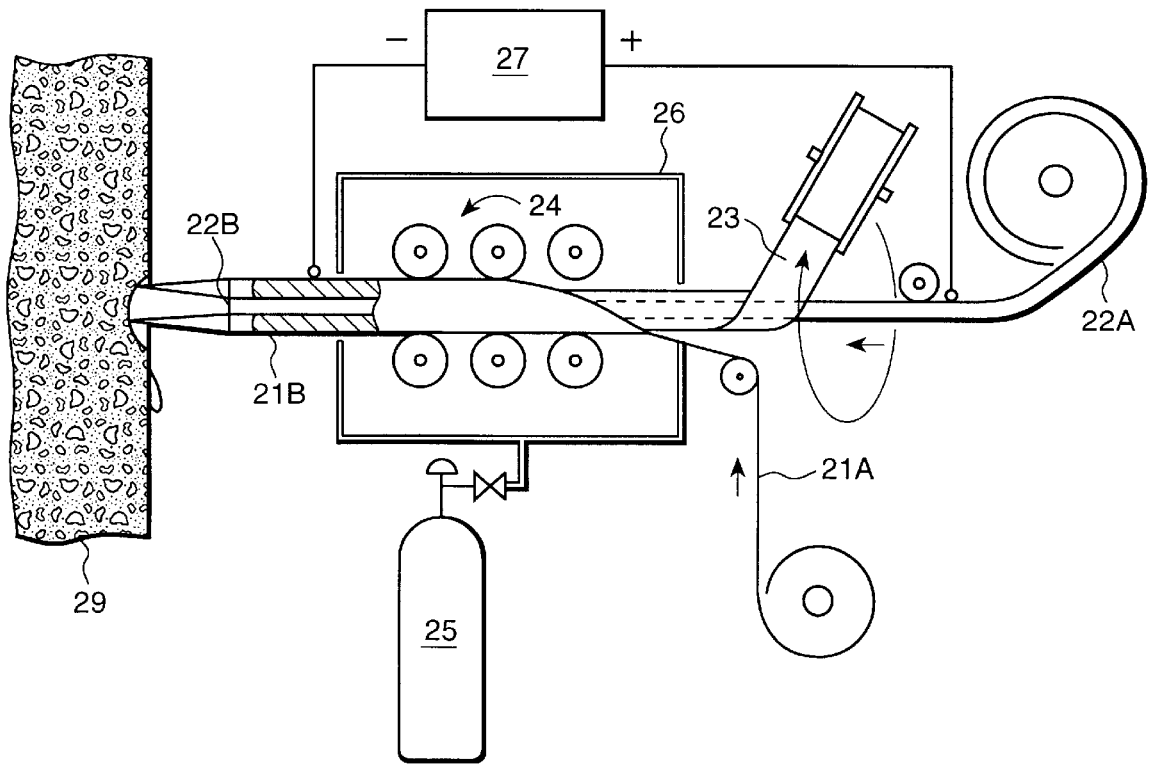
FIG. 3 is a sectional view generally showing a layout of essential parts of the plasma cutting apparatus for the purpose of explaining how to cut a concrete structure according to Embodiment 2 of the present invention.
Figure 4:
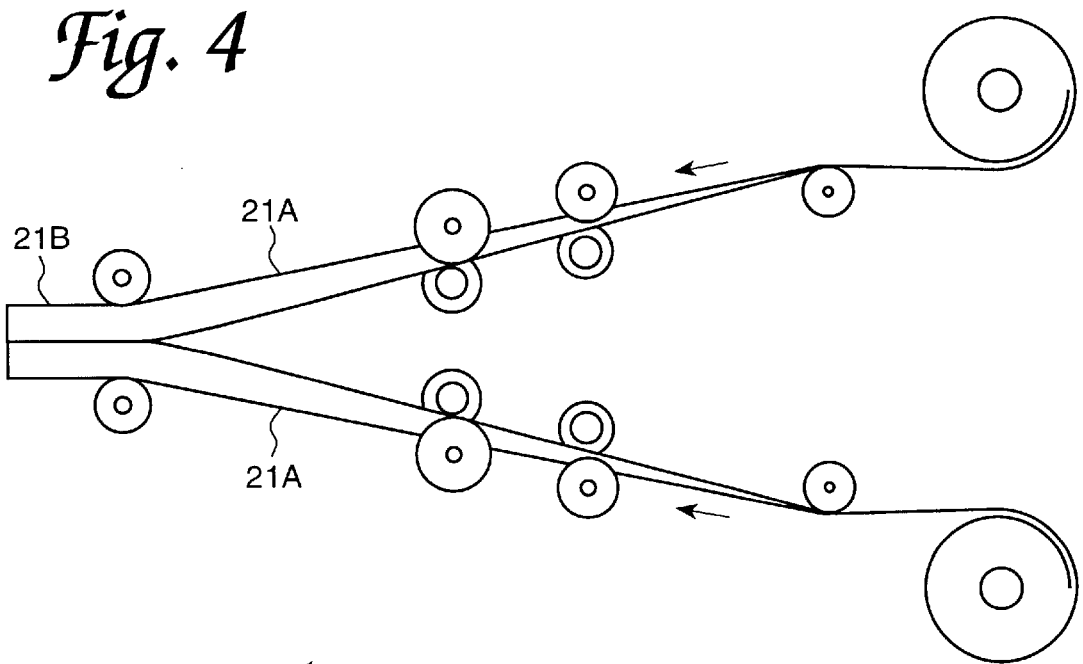
FIG. 4 is a plan view showing another embodiment of fabrication of the outer electrode in the apparatus shown in FIG. 3.
Figure 5:
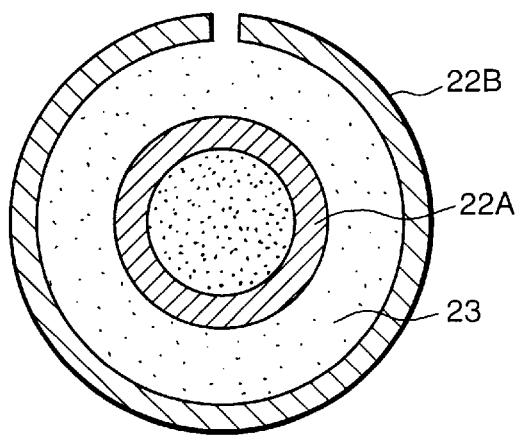
FIG. 5 is a sectional view illustrating a structure of the inner and outer electrodes fabricated in the apparatus shown in FIG. 3.
Figure 6:
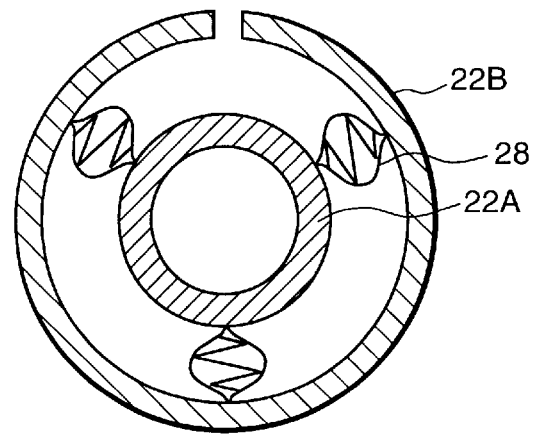
FIG. 6 is a schematic view for illustrating how an arc is generated at the ends of the inner and outer electrodes.

The second embodiment of the plasma cutting apparatus for concrete structures according to the present invention will now be explained with reference to FIG. 3. This plasma cutting apparatus for concrete structures comprises means for continuously uncoiling a metal strip 21A that serves as an outer electrode 21B, several sets of rolls 24 for bending the uncoiled metal strip 21A such that the widthwise section thereof is in circular form, means for feeding a metal rod or pipe 22A that serves as an inner electrode 22B into the outer electrode 21B together with an electrical insulating yet gas-transmitting spacer 23, a gas source 25 for feeding a plasma forming gas into a gap between the inner and outer electrodes, a sealed housing 26 in which the above-mentioned sets of rolls 24 are housed, and which has one end through which the above-mentioned metal strip 21A, metal rod or pipe 22A and spacer 23 are to be fed and the other end through which the inner and outer electrodes 21B and 22B are to be fed out, with an internal space connected with the gas source 25, and a power source 27 for applying voltage between the inner and outer electrodes 22B and 21B to generate an arc across the ends of the inner and outer electrodes.

The inner electrode is formed of a soft steel tube of 11.0 mm in outer diameter and 2.2 mm in thickness, and is loosely provided thereon with a spiral form of gauze of about 0.6 mm in thickness, in which an ilmenite type flux has been fixedly dispersed. This electrode is to be fed into the sealed housing. The outer electrode is obtained by uncoiling a soft steel sheet of 1.0 mm in thickness and 70 mm in width, feeding it into the sealed housing in which it is bent by the rolls to form a tube of 21 mm in outer diameter and circular shape in section. The above mentioned inner electrode is wrapped inside of the outer electrode. An inlet in the sealed housing, through which the metal strip and the metal tube having the insulating flux fabric wound therearound are to be fed in, and an outlet in the sealed housing, through which the formed electrodes are to be fed out, are both sealed up with rubber sheets to minimize any possible gas leakage.

EXAMPLE 2-1

A gas mixture with oxygen:nitrogen=4:1 by volume was fed into the sealed housing at a pressure of 10 atm. This gas could pass through the insulating flux fabric and be jetted from the open end at sufficient speed. Expansion caused by a temperature increase due to arc heating, of course, makes the flow rate of the plasma gas high.

Voltage was applied between the inner and outer electrodes for arc generation. The resulting discharge current was about 530 A.

A concrete plate of 20 cm in thickness was used as the structure to be thermally cut. The thus generated plasma jets were impinged on the concrete plate. The apparatus was designed such that the whole can be placed on a truck movable on rails placed in front of the structures to be thermally cut. To compensate for consumption of the electrodes, the metal strip and tube were continuously fed, and the leading ends of the electrodes were moved forward depending the depth of the hole formed. Within about 30 seconds, a through-hole of about 40 mm in diameter could be formed in the concrete plate. Immediately following this, the apparatus was moved sideways by about 20 to 25 cm, at which thermal cutting was resumed. In this way, a 1.5-hour thermal cutting could be carried out continuously.

The rate of consumption of the electrodes was approximately 700 mm/min. When an existing electrode of 1 meter in length is used, thermal cutting can be continuously carried out for 1.1 min. using one electrode, because the effective length thereof is about 80 cm. Thus, the present invention enables thermal cutting to be carried out in a period of time 80 times as long or over an area 180 times as large.

As can be understood from the examples, the apparatus of the present invention enables structures to be thermally cut or drilled in an extremely effective manner.

As explained above, the plasma cutting apparatus for concrete structures according to the present invention can be very compact yet inexpensive owing to no need of any special cooling means because the electrode assembly is designed to be cooled by the plasma gas flowing through the gas passage defined between the first and second electrodes. It is thus possible to efficiently make a deep hole of a relatively small diameter while making use of high temperatures generated by plasmas.

Although the electrodes are consumed by arc heat, the product formed by the fusion thereof can be utilized to promote thermal cutting. Thus, the present invention is very effective.

With the preferred method for using the apparatus of the present invention, thermal cutting or drilling can be effectively carried out because, in addition to high temperature generated by plasmas, it is possible to make use of the heat of reaction between oxygen and the electrode material and the added metal powders, high temperatures due to thermit reactions, and a lowering of the melting point of the structures to be thermally cut, which is caused by the electrode material and the added powder material.

With the method for forming electrodes continuously, high-efficient thermal cutting is achievable because the plasma cutting of concrete structures can be carried out over an extended period of time using consumable electrodes and so an interruption of operation incidental to replacement of electrodes can be avoided.

It is to be noted that the apparatus of the present invention is applicable not only to concrete structures but also to bulky mineral materials such as rocks and firebricks and, besides, can be used to thermally cut heat-resistant metal materials which have difficulty in thermal cutting by flame jets.

What is claimed is:

1. A plasma cutting apparatus for cutting a concrete structure comprising:

a consumable electrode assembly including a first consumable electrode formed of a metallic hollow rod, a second consumable electrode which is in metallic rod or tube form and is inserted through a hollow portion of the first electrode, an insulator located between the first and second electrodes, and a gas-flowing passage located between the first and second electrodes;

a plasma gas feeder mechanism which is connected to one end of the first electrode for feeding plasma gas into said passage;

a plasma power source for applying voltage between the first and second electrodes; and said insulator is a consumable flux comprising at least one ingredient which is adapted to lower the melting point of the concrete structure for facilitating said cutting.

2. A plasma cutting apparatus for cutting a concrete structure comprising:

a consumable electrode assembly including a first consumable electrode formed of a metallic hollow rod, a second consumable electrode which is in metallic rod or tube form and is inserted through a hollow portion of the first electrode, an insulator located between the first and second electrodes, and a gas-flowing passage located between the first and second electrodes:

a plasma gas feeder mechanism which is connected to one end of the first electrode for feeding plasma gas into said passage;

a plasma power source for applying voltage between the first and second electrodes;

means for continuously uncoiling a metal strip that serves as said outer electrode, sets of rolls for bending the uncoiled metal strip such that a widthwise section thereof is in circular form, means for feeding a metal rod or tube that serves as said inner electrode through said outer electrode together with an electrical insulating yet gas-transmitting spacer provided around said inner electrode, and a sealed housing in which said sets of rolls are housed, and which has one end through which said metal strip and said metal rod or tube are fed in together with said spacer and the other end through which said inner and outer electrodes are fed out, with an inner space thereof connected to a gas source.

* * * * *